(12) United States Patent
Bart

(10) Patent No.: US 6,193,627 B1
(45) Date of Patent: Feb. 27, 2001

(54) TOROIDAL DRIVE

(75) Inventor: Jörg Bart, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/212,529

(22) Filed: Dec. 16, 1998

(30) Foreign Application Priority Data

Dec. 20, 1997 (DE) .............................. 197 57 017

(51) Int. Cl.$^7$ ................................. F16H 15/38
(52) U.S. Cl. ................................. 476/40; 74/335
(58) Field of Search ................... 74/335, 730.1, 74/731.1; 476/2, 10, 40, 9; 477/37

(56) References Cited

U.S. PATENT DOCUMENTS

| 4,662,248 | 5/1987 | Greenwood | 74/867 |
| 5,415,056 | * 5/1995 | Tabata et al. | 74/335 |
| 5,575,732 | 11/1996 | Inoue | 476/10 |
| 5,711,741 | * 1/1998 | Inoue | 476/10 |

FOREIGN PATENT DOCUMENTS

| 2807971 | 8/1979 | (DE) . |
| 19702549A1 | 8/1997 | (DE) . |
| 0415391B1 | 3/1991 | (EP) . |

* cited by examiner

*Primary Examiner*—David A. Bucci
*Assistant Examiner*—Colby Hansen
(74) *Attorney, Agent, or Firm*—Davis and Bujold

(57) ABSTRACT

The invention relates to a toroidal drive having a continuously variable ratio and an output pulleys disposed co-axially to an input pulleys, semi-toroidal faces facing each other and at least one friction roller which rolls on the toroidal surfaces and transmits a torque from one pulleys to the other, wherein the friction roller is rotatably mounted in a roller carrier which is pivotally mounted around a swivel axis across an input shaft in a holding device in a housing and is adjusted and at the same time swivelled by a hydraulic actuation device having a cylinder and a double-acting piston in direction of the swivel axis. It is proposed that a valve device (28) with a piston slide valve (33) produce by means of leading edges (38,39,40,41) a pressure difference proportional to the desired torque to be transmitted and with which are loaded both piston sides (24, 25) and front faces opposite each other (42, 43) of the piston slide valve (33).

12 Claims, 4 Drawing Sheets

TOROIDAL DRIVE

BACKGROUND OF THE INVENTION

A toroidal drive, having a continuously variable ratio, which has at least two pulleys with toroidal facing surfaces between which friction rollers roll to transmit a torque from one pulleys to the other, are well known. One of the pulleys is connected with an input shaft and the other with an output shaft. To change the ratio, the axes of rotation of the friction rollers relative to the input axis are swivelled so that the friction rollers on the input pulleys move on a contact radius which is different from the contact radius on the output pulleys. The ratio to each other of the contact radii gives the reduction ratio.

DE 28 07 971 A shows a simple toroidal drive of that kind in which the friction rollers are supported in a holding device and swivelled via an axially movable drum.

EP 0 415 391 B1 has disclosed a toroidal drive in which, two friction rollers diametrically disposed relative to an input shaft and between an input pulleys and an output pulleys, are disposed which have semi-toroidal surfaces opposite each other. The friction rollers are supported on eccentric shafts of two roller carriers which are pivoted in a holding device connected with a transmission housing. By means of hydraulic setting devices, the roller carriers can be adjusted in direction of their swivel axis wherein they are simultaneously tilted. Since the friction rollers are situated diametrically to the input shaft, they are swivelled in opposite directions, that is, when one roller is swivelled clockwise, the other is swivelled counterclockwise.

The hydraulic setting device has a double-acting piston, the sides of which are loaded by a pressure difference, which is produced by a valve unit having a piston slide valve with four leading edges. A control unit adjusts the piston slide valve, via control springs, by means of a stepping motor and thus adjusts the reduction ratio desired. A mechanical return system, which contains a cam and lever mechanism, determines the tilting movement of the roller carrier, and acts likewise upon the piston slide valve and ensures that the adjusted reduction ratio be maintained.

The valve device has a strong, non-linear reinforcement of the pressure difference relative to the ratio divergence which can only be overcome with difficulty and particularly, in case of extremely high ratios, for example, by geared systems. Thus yields driving conditions hard to control when starting. In such transmissions the continuously variable reduction step, the so-called variator, is situated in a power branch of a power distribution transmission and can be regulated so that in an operating state the output shaft of a cumulative steps assumes the speed zero and thus stands a vehicle with such an input. During very low output speeds, very high torques appear which, even if desired for starting, cannot be braked by the service brakes when the vehicle is parked and thus result in creeping of the vehicle. In addition, the speed sensors required for regulating the speed are not capable of determining any low speeds which strive against zero.

SUMMARY OF THE INVENTION

The problem on which the invention is based is to improve and more reliably to control the starting characteristics of a vehicle.

According to the invention there is provided a toroidal drive (1) providing a continuously variable ratio and having an output pulleys (6) disposed co-axially to an input pulleys (3), defining opposite semi-toroidal surfaces (7, 8), and at least one friction roller (9, 10) which rolls on said semi-toroidal surfaces (7, 8) and transmits a torque from one pulleys (3, 8) to the other, wherein said friction rollers (9, 10) are pivoted in a roller carrier (15, 16) which is tiltably supported around a swivel axis (17, 18) across an input shaft (2) in a holding device (19) in a housing (20) and adjusted about said swivel axis (17, 18) by a hydraulic actuation device with one cylinder (26, 27) and one double-acting piston (22, 23), wherein a valve device (28) with a piston slide valve (33) produces by means of leading edges (38, 39, 40, 41) a pressure difference in proportional to the desired torque (40, 41) to be transmitted with which are loaded both piston sides (24, 25) and front faces opposite each other (42, 43) of said piston slide valve (33).

According to the invention, the valve device produces, in proportion to the desired torque to be transmitted, a pressure difference which is regulated by the return to the opposite front faces of the piston slide valve. Thereby starting characteristics are obtained that can be well controlled and also a stable regulation with good frictional contact ratios between friction rollers and the semi-toroidal surfaces, since when parking no torque crops upon the output shaft while when starting the torque can be increased at will up to the maximum. Since the pressure difference acting upon the piston sides which corresponds to the torque-proportional supporting force, retroacts hydraulically to the piston slide valve of the valve device, it is possible to eliminate the quite complex mechanical return flow of the prior art, in addition, the valve bushing can be firmly connected with the valve housing or be an integral part of the valve housing.

As a rule the piston slide valve has four leading edges in order to set the pressure ratio on the two piston sides. Two leading edges are here associated with one piston side, specifically the one which controls the communication to the feed-in port and the other which controls the communication to the return flow.

According to an embodiment of the invention, the piston slide valve has only two leading edges. These are associated with one piston side while the other piston side is loaded with a constant pressure. Thus the pressure difference results in this simple arrangement from the difference between the constant pressure and the variable pressure.

When the direction of the torque to be transmitted reverses to the coasting operation, the supporting force and thus the pressure difference on the piston sides become negative, that is, the piston side loaded with the higher pressure in the traction operation is loaded with a lower pressure in the coasting operation. This would result in that the pressure force acting upon the piston slide valve changes its direction of action when switching from traction to coasting operation. To prevent this, it is proposed that the front faces of the piston slide valve loaded with pressure of the piston sides be unequally dimensioned and thus synchronized to each other so that the pressure force acting upon the piston slide valve maintains its direction of flow when the direction of the torque to be transmitted is reversed.

The piston slide valve is conveniently loaded on the front side by a control pressure which is proportional to the desired torque to be transmitted. Said control pressure can be adjusted by means of a control unit via a pressure regulator and pressurizes part of the front surface of the whole front surface of the piston slide valve which is designed as step. The remaining part of the front surface is then conveniently loaded by the pressure of one piston side. In the balanced state, the pressure difference set by the piston slide valve on the piston sides corresponds to the pressure preset by the pressure regulator. It is convenient here that the surface part loaded with control pressure be situated on the side of the piston slide valve which has the smaller front face which is loaded by the pressure of a piston side.

One other, naturally more expensive alternative consists in that in case of equal front faces of the piston slide valve which are loaded by the pressure of the piston slides, there be provided on both sides of the piston slide valve surface portions for a control pressure which can be loaded with different control pressures, specifically on the side for setting a traction torque and on the other side for setting a pull torque.

To change the torque to be transmitted, the pressure difference and thus the supporting force of the friction rollers are changed. Thereby changes simultaneously the ratio, which results in a corresponding increase of torque. The valve device has, without throttle devices, control springs and accumulator, a strong differentiating action. By using control springs, this characteristic can be attenuated. With throttle device and accumulators, it is possible to impress a damping and/or integrating characteristic in order to set an optimal adjustment characteristic. It is convenient here that the throttle devices be adjustable. If on the input side before the continuously variable reduction step a reversing gear step is switched, with the reversal of the direction of rotation in the toroidal drive, the direction of action of the supporting forces reverses. Nevertheless, in order to be able to maintain the control of the piston slide valve for both pressure directions, the lines lead to the piston sides, via a shifting valve, which is controlled by a reverse drive signal and changes the loading of the piston sides according to the signal.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
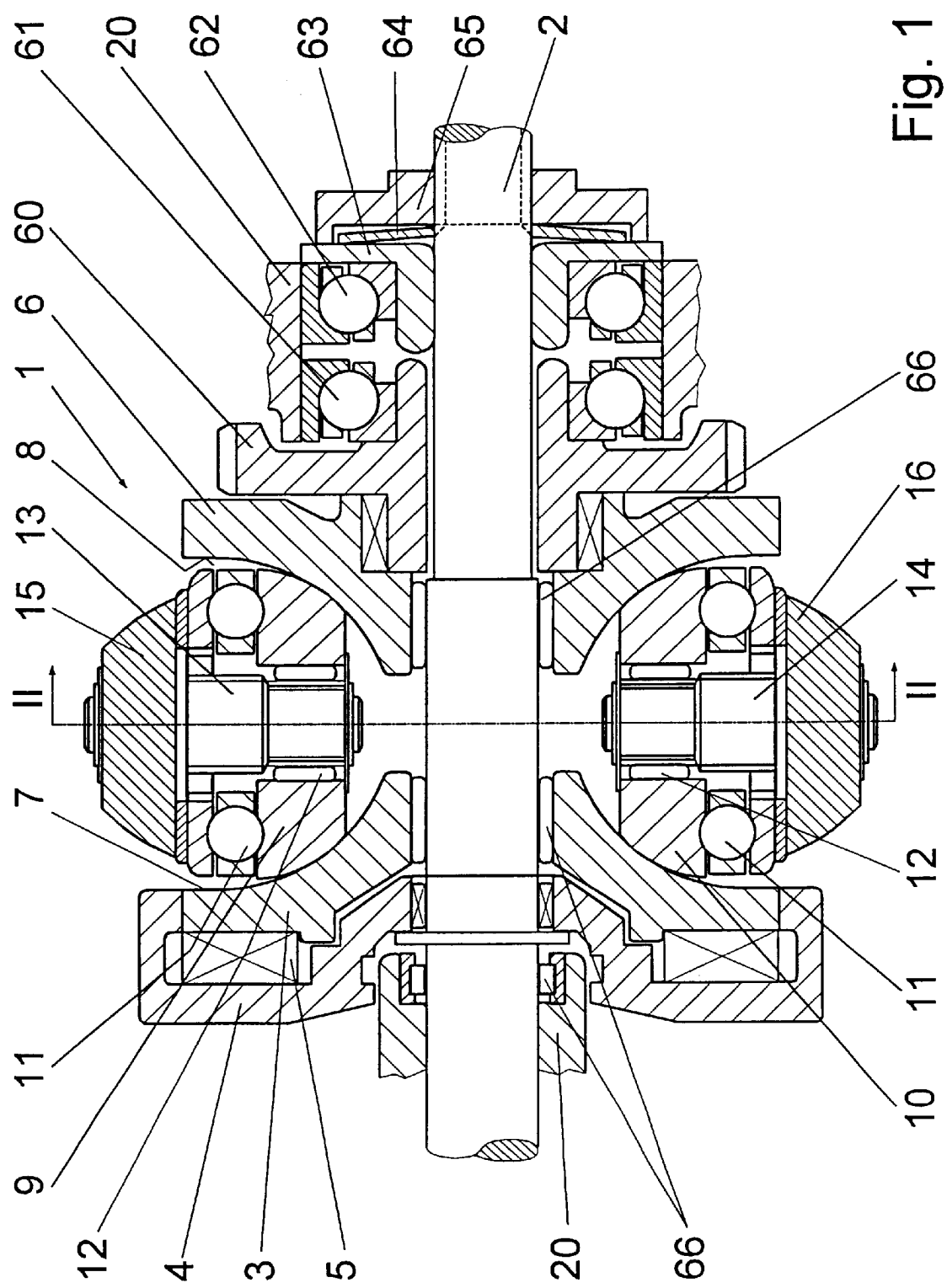
FIG. 1 is a diagrammatic longitudinal section through a toroidal drive with semi-toroidal surfaces.
Figure 2:
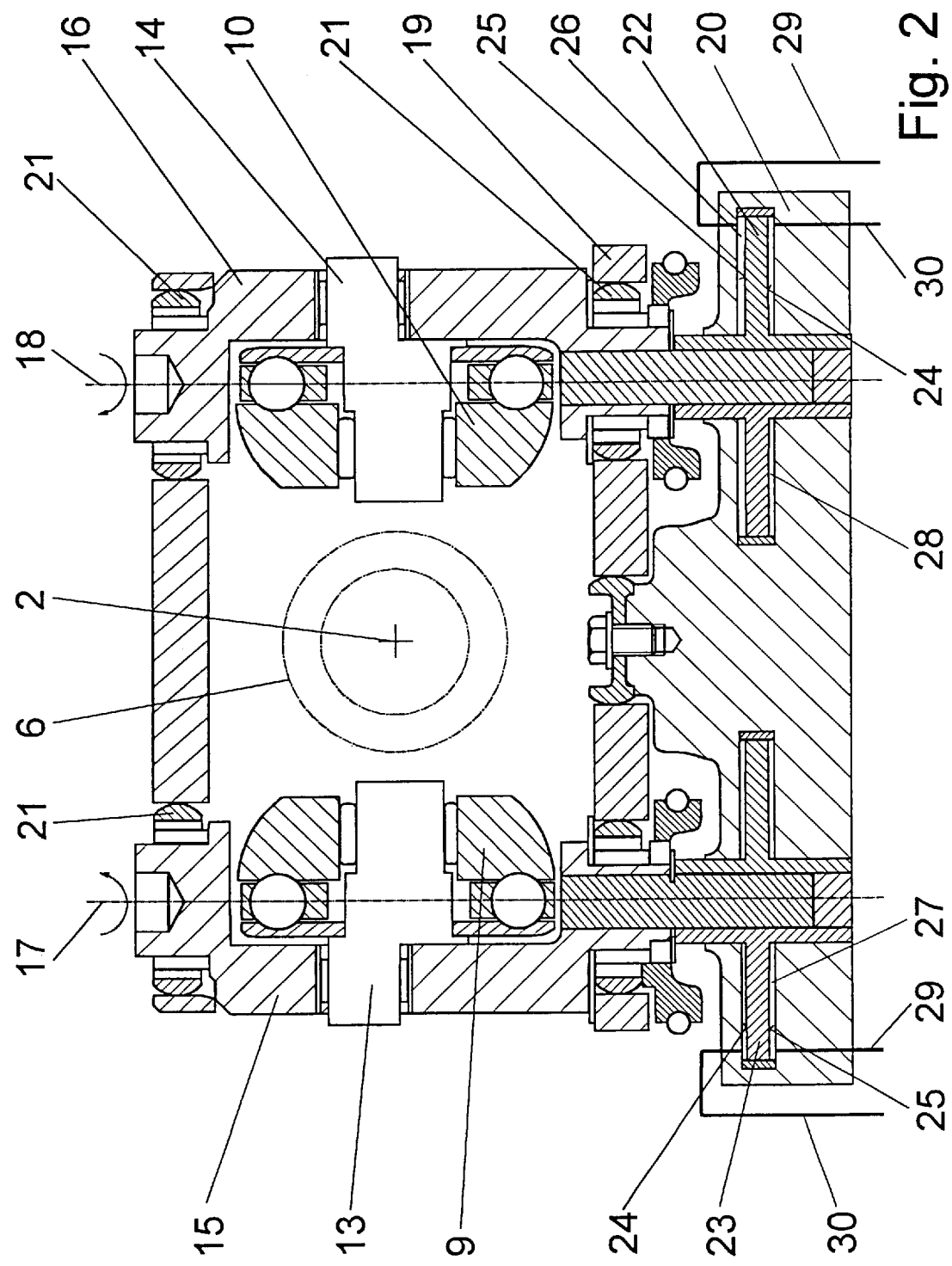
FIG. 2 is a section according to line II—II in FIG. 1.

Toroidal drive 1 has an input shaft 2 supported in a housing 20 by means of an angular ball bearing 62 and by means of an anti-friction bearing 66. To the input shaft 2 is secured a thrust washer 4 which, via the input shaft 2, is directly or indirectly connected non-rotatably with an input pulleys 3. The input pulleys 3 has on a face, remote from the thrust washer 4, a semi-toroidal surface 7 which is faced mirror symmetry about a plane perpendicularly to the input axis 2, a semi-toroidal surface 8 of an output pulleys 6. The output pulleys 6 is non-rotatably connected with an output gear 60 which is supported opposite in the housing 20 by means of an angular ball bearing 61. The output pulleys 6 is also supported on the input shaft 2 by means of an anti-friction bearing 66. The angular ball bearings 61, 62 are prestressed without play by a bearing ring 63, a plate spring 64 and a shaft nut 65.

Between the input pulleys 3 and the output pulleys 6, diametrically disposed relative to the input shaft 2, are two friction rollers 9, 10 which have peripheries which roll upon the semi-toroidal surfaces 7, 8. In driving operation, a torque is transmitted from the input pulleys 3 to the output pulleys 6 and in the coasting operation in reverse direction. The torque is supported by roller carriers 15 and 16 upon the eccentric shafts 13, 14 on which the friction rollers 9, 10 are pivoted by axial bearings 11 and radial bearings 12.

Between the thrust washer 4 and input pulleys 3 is provided a pressure device 5 in order to adapt to the torque to be transmitted, the pressure applied to the friction rollers 9, 10 on their contact surfaces on the semi-toroidal surfaces 7, 8. The pressure device 5 can act mechanically or hydraulically.

Figure 3:
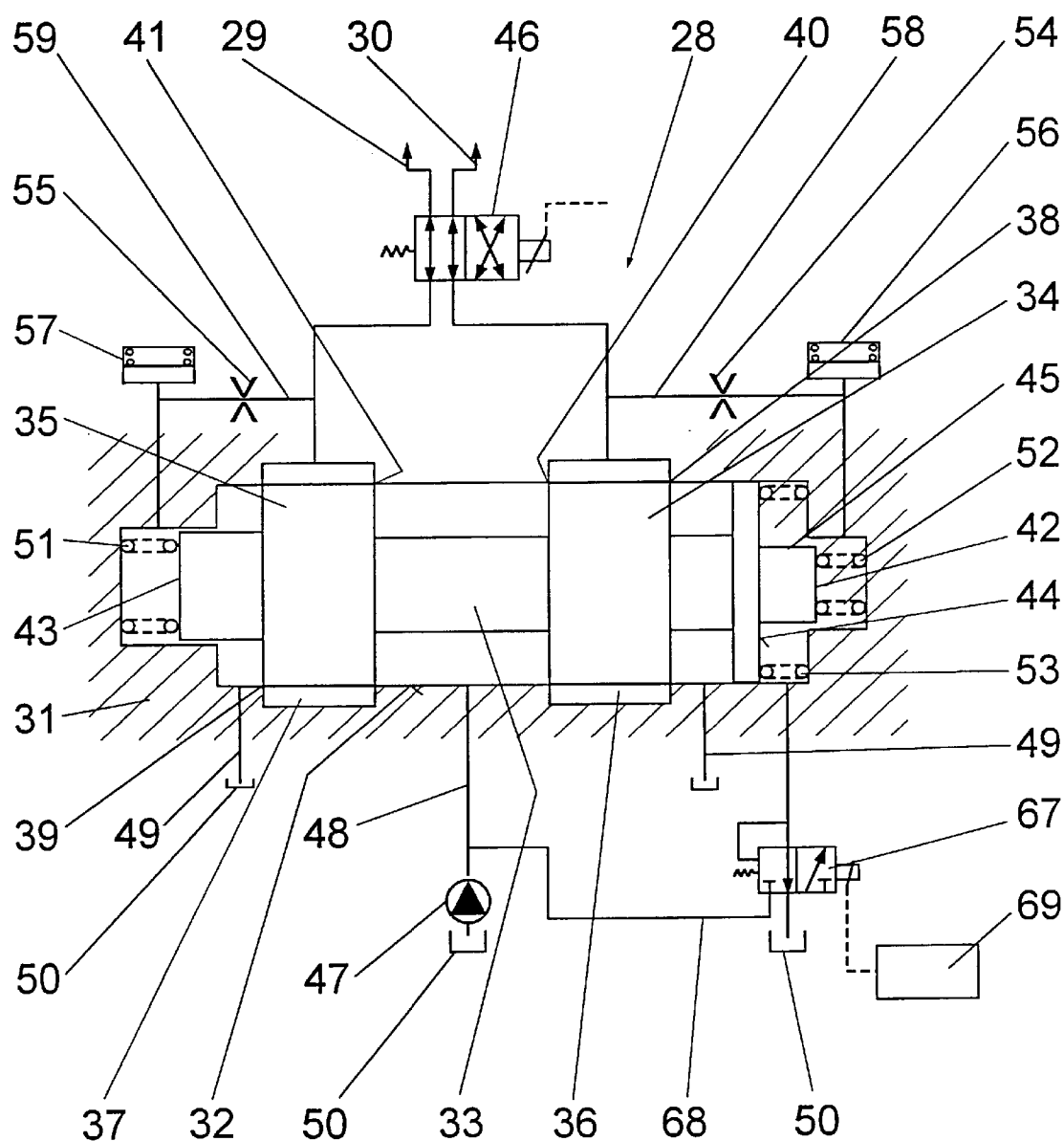
FIG. 3 is a diagrammatic section through a valve device.

The roller carriers 15, 16 are pivoted around swivel axes 17, 18 in a holding device 19 by means of spherical bearings 21. They are connected with double-acting pistons 22, 23 of a setting device by which they can be adjusted in direction of the swivel axes 17, 18. Due to this adjustment, the friction rollers 9, 10, as a consequence of the geometrical ratios on the contact surfaces, are moved in opposite directions around the swivel axes 17, 18 whereby the reduction ratio and the torque to be transmitted change. By the setting device the torque to be transmitted shows itself in the form of an axially acting supporting force. To that end, the piston sides 24, 25 opposite each other are loaded via lines 29, 30 with a pressure difference produced by a valve device 28 (FIG. 3,4). Instead of the double-acting pistons 22, 23, two separate pistons which interact in the same manner, can be used.

The valve device 28 has a piston slide valve 33 axially movable in a valve bushing 32. This is integral part of a valve housing 31. The piston slide valve 33 has two control collars 34, 35 which by their leading edges 38, 39, 40, 41 interact with corresponding leading grooves 36, 37 of the valve bushing 32. The lines 29, 30 lead from the leading grooves 36, 37 to the corresponding piston sides 24, 25. A pump 47, via a feed-in port 48, conveys pressurized medium from a sump 50 to an intermediate space between the control collars 34 and 35. The pressurized medium flows back to the sump 50, via a return flow 49, on the outer sides of the control collars 34, 35.

A front face 43 of the piston slide valve 33 is loaded, via a connecting line 59, which branches off from the line 29, with the same pressure as the piston side 25 while the opposite front face 42 of the piston slide valve 33 is loaded, via a connecting line 58, which branches off from the line 30, with the same pressure as the piston side 24. The front faces 43 and 42, each of which can constitute a portion of the front face of a stepped whole front face, are synchronized with each other so as to retain the direction of action of the pressure forces returned to the piston slide valve 33 when the direction of the torque to be transmitted is reversed in the coasting operation. Thereby the piston slide valve 33 can always be controlled independently of the pull-push operation by the same side with a control pressure proportional to the torque desired.

The front face 42 constitutes only a portion of the real front face of the piston sliding valve 33 shown in FIG. 3. Another front face portion 44 is situated axially offset by a step 45 and is loaded with control pressure via a control line 68 and a pressure-regulating valve 67. An electronic control unit 69 activates the pressure-regulating valve 67 so that it produces a control pressure corresponding to the desired torque to be transmitted.

In the balanced position in which the pressure difference which loads both piston sides 24,25 corresponds to the desired torque to be transmitted which is preset by the control pressure, the control collars 34, 35 shut off through flow from the feed-in port 48 or from the return flow 49 to the lines 29, 30 (negative contact ratio). If the balanced position is upset, the piston slide valve 33 moves and opens on a leading edge 40 or 41 the connection of the feed-in port 48 to one of the lines 29 or 30. While one line 29 or 30 is connected with the feed-in port 48, the other respective line 29 is simultaneously separated from the feed-in port 48 and connected with the return flow 49 so that a pressure difference corresponding to the balanced position can quickly be re-established.

The valve device 28 basically shows a strongly differentiating effect. By control springs 51, 52, 53 this effect can be attenuated. The throttle devices 54 and 55 in the connecting lines 58, 59 further serve as a damping characteristic to which an integrating characteristic can be provided in addition by the accumulator components 56 and 57. Thus the valve device can be adjusted to an optimal control characteristic. To this end throttle devices 54, 55 are conveniently adjustable.

Instead of the piston slide valve 33 with four leading edges 38 to 41 shown in FIG. 3, it is also possible to use a simplified piston slide valve 72 (FIG. 4) with only two leading edges 38, 40 when the other line 29 is supplied with a constant pressure over valve "X". With said valve "X" the pressure in the line 29 is set so as to be so below the maximum pressure in the line 48 that a balance can appear on the faces 43 and 42 under all pull-push states. The supporting force on the pistons 22, 23 results then from the difference between the constant pressure and the pressure modulated by the control pressure.

Figure 4:
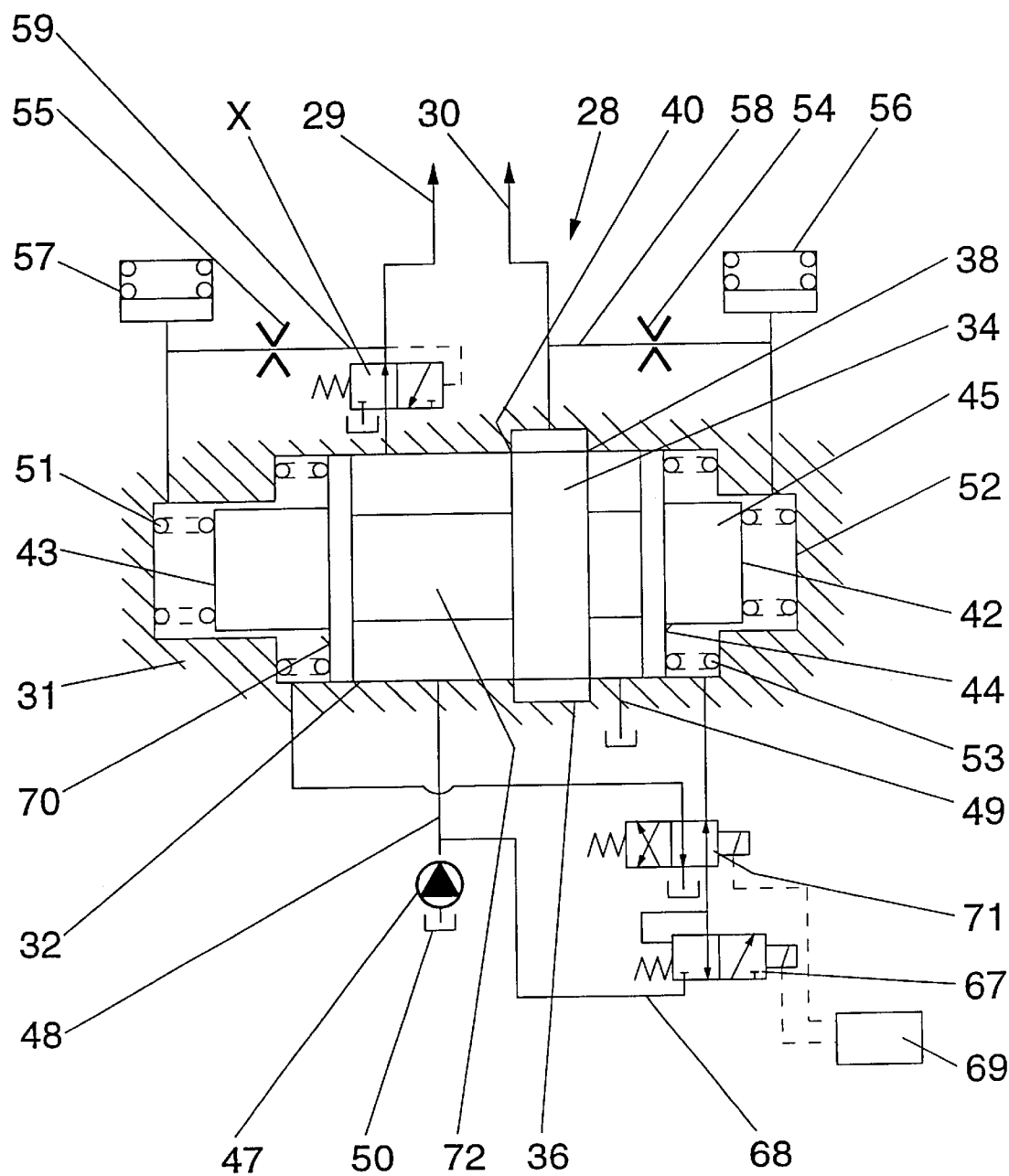
FIG. 4 is one variant of a valve device according to FIG. 3.

The lines 29 and 30 are passed through a shifting valve 46 by which the pressure loading of the piston sides 24, 25 can be changed to a reverse gear. This is convenient when on the input side before the continuously variable gear step there is provided a reverse step so that during reverse drive the directions of rotation of the input pulleys and of the output pulleys reverse and thus the direction of action of the supporting force changes. The control pressure in reverse drive could alternatively load a front face portion 70 on the opposite side of the piston slide valve 33 (FIG. 4). In such an arrangement the front face portions 42, 43 loaded by the piston sides 29, 30 could also be kept equal when the control pressure is also switched to the respective other front face portion 42, 70 when changing from pull to push operation. The shifting valve 46 could also be replaced by a shift valve 71 which is correspondingly controlled by the control unit 69.

What is claimed is:

1. A toroidal dove (1) providing a continuously variable ratio having an input pulley (3) and an output pulley (6), the input pulley (3) having a semi-toroidal surface (7) and the output pulley (6) having an opposite semi-toroidal surface (8), at least one friction roller (9, 10) which rolls on said semi-toroidal surfaces (7, 8) and transmits a torque from one of the input pulley and the output pulley (3 or 6) to the other of the input pulley and the output pulley (6 or 3), wherein said at least one friction roller (9, 10) is pivotably supported by a roller carrier (15, 16) which is supported by a holding device (19) of a housing (20), the at least one friction roller (9, 10) and the roller carrier (15, 16) are pivotable about a swivel axis (17, 18) which extends perpendicular to a longitudinal axis of an input shaft (2), a hydraulic actuation device which comprises a cylinder (26,27) and a double-acting piston (22,23) controls pivoting movement of the at least one friction roller (9, 10) about the swivel axis (17, 18), said double-acting piston (22, 23) has a first side (24) and an opposed second side (25), the hydraulic actuation device further comprises a valve device (28) which has a piston slide valve (33), said piston slide valve (33) has a first face (42) and a second opposed face (43), said piston slide valve (33) has at least two leading edges (38, 39, 40, 41) which load a desired side (24 or 25) of the double-acting piston and a desired face (42 or 43) of said piston slide valve (33) and facilitate a pressure difference proportional to a desired torque (40, 41) to be transmitted by the toroidal drive (1).

2. The toroidal drive (1) according to claim 1, wherein said piston slide valve (33) has two control collars and four leading edges (38, 39, 40, 41), and one of the leading edges (38, 39, 40, 41) controls communication between a feed-in port (48) and one of the first and second sides (24 or 25) of said double-acting piston (22, 23) and another of the four leading edges (38, 39, 40, 41) controls communication between a return flow (49) and the other of the first and second sides (24 or 25) of said double-acting piston (22, 23).

3. The toroidal drive (1) according to claim 1, wherein said piston slide valve (33) has first and second leading edges (38,40), the first leading edge (40) controls communication from a feed-in port (48) to the first piston side (24) of said double-acting piston (22, 23) and the second leading edge (38) controls communication from the first piston side (24) of said double-acting piston (22, 23) to a return flow (49) while the second piston side (25) of said double-acting piston (22, 23) is supplied with a constant pressure.

4. The toroidal drive according to claim 1, wherein the pressure supplied to said first and second opposed faces (42, 43) of said piston slide valve (33) and said first and second piston sides (24, 25) is synchronized so that a pressure force acting upon said piston slide valve (33) maintains a direction of action even when a reverse in a direction of the torque to be transmitted occurs.

5. The toroidal drive according to claim 1, wherein at least the first face (42) of said piston slide valve (33) has a step (45) with a face portion (44), the first face (42) is loaded with pressure supplied to the first piston side (24) and the face portion (44) is loaded with a control pressure corresponding to the desired torque to be transmitted.

6. The toroidal drive according to claim 5, wherein a first control spring (52) engages with said first face (42) to bias said piston slide valve (33) in a first direction, a second control spring (51) engages with said second face (43) to bias said piston slide valve (33) in a second opposite direction, and a third control spring (51) engages with the face portion (44) to bias said piston slide valve (33) in the first direction.

7. The toroidal drive according to claim 1, wherein fluid supply and return lines (29, 30) connect the double-acting piston (22, 23) with said piston slide valve (33) and first and second connecting lines (58, 59) connect said first and second faces (42, 43) of said piston slide valve (33) with the fluid supply and return lines (29, 30), and a throttle device (54, 55) is located in each of the first and second connecting lines (58, 59).

8. The toroidal drive according to claim 7, wherein each throttle device (54, 55) is adjustable to control flow of control fluid therethrough.

9. The toroidal drive according to claim 7, wherein a first accumulator component (56) is located in the connecting line (58) between the throttle device (54) and said first face (42) of said piston slide valve (33), and a second accumulator component (57) is located in the connecting line (59) between the throttle device (55) and said second face (43).

10. The toroidal drive according to claim 7, wherein a shifting valve (46) is provided along the fluid supply and return lines (29, 30) connecting the double-acting piston (22, 23) with said piston slide valve (33), and the shifting valve (46) is controlled by a reverse drive signal.

11. A toroidal drive (1) providing a continuously variable ratio having an input pulley (3) and an output pulley (6), the input pulley (3) having a semi-toroidal surface (7) and the output pulley (6) having an opposite semi-toroidal surface (8), first and second friction rollers (9, 10) which roll on said semi-toroidal surfaces (7, 8) and transmit a torque from one of the input pulley and the output pulley (3 or 6) to the other of the input pulley and the output pulley (6 or 3), wherein the first friction roller (9) is pivotably supported by a roller carrier (15), the first friction roller (9) and the roller carrier (15) are pivotable about a first swivel axis (17) which extends perpendicular to a longitudinal axis of an input shaft (2), the second friction roller (10) is pivotably supported by a roller carrier (16), the second friction roller (10) and the roller carrier (16) are pivotable about a second swivel axis (18) which extends perpendicular to a longitudinal axis of an input shaft (2), both the first and the second friction rollers (9, 10) are supported by a holding device (19) of a housing (20), a hydraulic actuation device which comprises a cylinder (26, 27) and a pair of double-acting pistons (22, 23) control pivoting movement of the first and second friction rollers (9, 10) about the first and second swivel axes (17, 18), each of said pair of double-acting pistons (22, 23) has a first side (24) and an opposed second side (25), the hydraulic actuation device further comprises a valve device (28) which has a piston slide valve (33), said piston slide valve (33) has a first face (42) and a second opposed face (43), said piston slide valve (33) has at least two leading edges (38, 39, 40, 41) which load a desired side (24 or 25) of the pair of double-acting pistons and a desired face (42 or 43) of said piston slide valve (33) and facilitate a pressure difference proportional to a desired torque (40, 41) to be transmitted by the toroidal drive (1);

fluid supply and return lines (29, 30) connect the pair of double-acting pistons (22, 23) with said piston slide valve (33) and first and second connecting lines (58, 59) connect said first and second faces (42, 43) of said piston slide valve (33) with the fluid supply and return lines (29, 30), and a throttle device (54, 55) is located in each first and second connecting line (58, 59); and at least the first face (42) of said piston slide valve (33) has a step (45) with a face portion (44), the first face (42) is loaded with pressure supplied to the first piston side (24) and the face portion (44) is loaded with a control pressure corresponding to the desired torque to be transmitted.

12. A toroidal drive (1) providing a continuously variable ratio having an output pulley (6) disposed co-axially to an input pulley (3), defining opposite semi-toroidal surfaces (7, 8), a first friction roller (9) and a second friction roller (10) which both roll on said semi-toroidal surfaces (7, 8) and transmit a torque from one pulley (3, 6) to the other pulley, wherein said first friction roller (9) is pivoted in a first roller carrier (15) which is tiltably supported around a swivel axis (17) and said second friction roller (10) is pivoted in a second roller carrier (16) which is tiltably supported around a swivel axis (18), both said friction rollers pivoting perpendicular to an input shaft (2) in a holding device (19) in a housing (20) and said first friction roller (9) is adjusted about said swivel axis (17) by a hydraulic actuation device with a first cylinder (27) and a first double-acting piston (23) said first piston having a first side (24) and a second side (25), and said second friction roller (10) is adjusted about said swivel axes (18) by a hydraulic actuation device with a second cylinder (26) and a second double-acting piston (22) said second piston having a first side (24) and a second side (25), a valve device (28) with a piston slide valve (33) said slide valve having opposing front faces (42,43), produces by means of leading edges (38, 39, 40, 41) a pressure difference proportional to a desired torque (40, 41) to be transmitted with which are loaded both said piston sides (24, 25) and said front opposing faces (42, 43) of said piston slide valve (33).

* * * * *